United States Patent [19]

Porth et al.

[11] Patent Number: 4,831,876
[45] Date of Patent: May 23, 1989

[54] MEASUREMENT PROBE

[75] Inventors: Wolfgang Porth, Frankfurt am Main; Wolfgang Weibler, Hofheim, both of Fed. Rep. of Germany

[73] Assignee: VDO Adolf Schindling AG, Frankfurt am Main, Fed. Rep. of Germany

[21] Appl. No.: 21,299

[22] Filed: Mar. 3, 1987

[30] Foreign Application Priority Data

Mar. 3, 1986 [DE] Fed. Rep. of Germany ....... 3606853

[51] Int. Cl.$^4$ .............................................. G01F 1/68
[52] U.S. Cl. .............................. 73/204.16; 73/204.26
[58] Field of Search .......................................... 73/204

[56] References Cited

U.S. PATENT DOCUMENTS

| 4,080,821 | 3/1978 | Johnston | 73/204 |
|---|---|---|---|
| 4,276,773 | 7/1981 | Kawai et al. | 73/204 |
| 4,322,970 | 4/1982 | Peter | 73/204 |
| 4,468,963 | 9/1984 | Schauble | 73/204 |
| 4,566,320 | 1/1986 | Bohrer | 73/204 |
| 4,587,842 | 5/1986 | Handtmann | 73/204 |
| 4,633,578 | 1/1987 | Aine et al. | 73/204 |
| 4,688,424 | 8/1987 | Handtmann | 73/204 |

FOREIGN PATENT DOCUMENTS

| 2929427 | 2/1981 | Fed. Rep. of Germany . |
|---|---|---|
| 3127081 | 1/1983 | Fed. Rep. of Germany . |
| 3208096 | 9/1983 | Fed. Rep. of Germany . |

Primary Examiner—Herbert Goldstein
Attorney, Agent, or Firm—Martin A. Farber

[57] ABSTRACT

In a measurement probe for measuring the mass of a flowing fluid, particularly the intake air of an internal-combustion engine, having at least one temperature-dependent first resistor which is arranged in the flow of the fluid and is part of a bridge circuit and the temperature and/or resistance of which is controlled as a function of the flowing mass, the actuating variable being a measure of the mass of the flowing fluid, a second resistor which is connected in parallel to the bridge circuit is arranged in the fluid downstream of the first resistor. In this way, the probe is directionally sensitive. Erroneous measurements by reverse flow are avoided. Furthermore, a third resistor, which is also part of the bridge circuit and is connected in series with the first resistor, can be arranged upstream in front of the first resistor directly in the fluid. This contributes to reducing the response time.

16 Claims, 2 Drawing Sheets

MEASUREMENT PROBE

FIELD AND BACKGROUND OF THE INVENTION

The present invention refers to a measurement probe for measuring the mass of a flowing fluid, particularly the intake air of an internal-combustion engine, having at least one temperature-dependent first resistor which is arranged in the path of the fluid and is part of a bridge circuit and the temperature and/or resistance of which is controlled as a function of the flowing mass, the actuating variable being a measure of the mass of the flowing fluid.

In known electrothermal air-mass sensors, a resistance layer which is applied to a flat support is traversed by a current which results in heating. Depending on the speed of flow of the air surrounding the sensor a greater or lesser amount of heat is removed from the resistance layer and the support. By the use of a resistance material having a positive or negative temperature coefficient, the flow can be so controlled that a constant temperature above the temperature of the air is obtained. The current required for this is then a measure of the velocity of flow.

One important field of use of such sensors is the measuring of the mass of air drawn in by internal combustion engines. This measurement is particularly important in order to control the combustion process of the internal-combustion engine so as to minimize the proportion of injurious substances upon the combustion.

Particularly in the case of Otto engines there are operating conditions with pulsating flow or even reverse flow which lead to erroneous measurements in known air-mass meters.

It has furthermore been found that the local heat-transfer coefficient is greatest in the vicinity of that edge of the sensor which is opposite the direction of flow and that it decreases with increasing distance from said edge. In this way, a temperature gradient is produced along the resistance layer and the support in the direction of flow, said gradient being dependent on the velocity of flow and causing a relatively long response time of the known sensors.

In order to reduce the response time, it is already known to dimension the current paths produced in the resistance layer in such a manner that the resultant electric heating output per unit of area is in a constant relationship to the local heat-transfer coefficient.

SUMMARY OF THE INVENTION

It is an object of the invention to provide an improved measurement probe of the foregoing type.

According to the invention, a second resistor (5) which is connected in parallel to the bridge circuit, is arranged within the fluid downstream of the first resistor (2). By measurement in accordance with the invention a directional sensitivity of the measurement probe is obtained. In this way, erroneous measurements are prevented in the case of pulsating flow or reverse flow.

A further development of the invention consists therein that a third resistor (4) which is also part of the bridge circuit and is connected in series with the first resistor is arranged in front of the first resistor (2) upstream in the fluid. Due to the fact that the third resistor is connected in series with the first resistor and thus a correspondingly larger current flows through the third resistor, this resistor is also heated. Since the third resistor is arranged upstream in the fluid, the fluid flows over the third resistor already before it passes over the first resistor. In this way, the local dependence of the heat-transfer coefficient on the first resistor becomes less, so that the response time is shortened as compared with known arrangements.

Further embodiments of the invention reside in the fact that the resistors (2, 4, 5) are applied as layers on a common support (10) or that the resistors (2, 4, 5) are applied as layers on several supports. The application of the resistors as layers on a common support has the advantage that the layers can be applied in a single operation. In this connection, however, limits exist with respect to the design of the electrical and other properties. In the case of the application of the layers to a plurality of supports, different technologies can, for instance, be used in order to obtain properties of the resistors which differ greatly from each other.

Another further development of the invention is characterized by the fact that the support (10) is structured by slits between the layers of the resistors (2, 4, 5). In this way, a thermal decoupling of the resistors is possible, insofar as necessary.

In accordance with another further development of the invention, the temperature coefficient of the third resistor (4) is substantially smaller in amount than the temperature coefficient of the first resistor (2).

Another further development in which the temperature coefficient of the third resistor (4) has a sign which is opposite the sign of the temperature coefficient of the first resistor (2) has the advantage that there is strong dependence of the voltage over the bridge diagonal on the temperature.

Another further development of the invention is characterized by the fact that the second resistor (5) has the same temperature coefficient as the first resistor (2). This development makes it possible for the first and second resistors to be produced by the same method.

Another further development of the invention consists in the fact that the second resistor (5) has a different temperature coefficient than the first resistor (4). This further development, however, requires differences upon the production of the resistors but an adaptation of the temperature coefficient of the second resistor to the requirements is possible independently of the design of the first resistor.

Another embodiment of the invention is that the resistors (2, 4, 5) are formed by meander-shaped current paths the width of which changes in the direction of flow of the fluid, in such a manner that the distribution of the heating power, the flow boundary layer and/or the temperature boundary layer are so developed that upon a sudden change in the velocity of flow on the measurement probe no temperature equalization processes which delay the response of the measurement probe take place. This embodiment produces a further shortening of the response time.

Another further development of the invention resides in the fact that, as measured in the direction of flow, the length of the first resistor (2) is less than the length of the third resistor (4) and the latter in turn is less than the length of the second resistor (5). By this further development, both a short response time and a pronounced directional sensitivity of the measurement probe are obtained.

A further improvement of the measurement probe of the invention is that the layers of the resistors (2, 4, 5)

are so designed by structuring the current flow paths and/or the layer thicknesses and/or the resistivity and by selection of the resistance values that the mean temperatures occurring upon them in the event of constant temperature of the fluids are in an approximately constant relationship to each other.

The control circuit of the measurement probe can advantageously be designed in the manner that the first and the third resistors form a first branch of the bridge circuit and that a temperature-dependent fourth resistor (1) is in the path of the fluid in a second branch of the bridge circuit, said fourth resistor (1) taking on the temperature of the fluid and bringing about, via a control, that the first, second and third resistors (2, 4, 5) asssume a temperature which is dependent on the temperature of the fluid but higher.

In a further embodiment of the invention, suitable temperature-independent resistors are connected in parallel and/or in series to the resistors (1, 2, 4) which form the bridge circuit. In this way adaptation of the temperature coefficients of the resistors to different requirements is possible.

In order to obtain the highest possible temperature dependence of the voltage of the bridge diagonal, resistors of approximately the same size are provided in each case in one branch of the bridge. In this way, the power which is converted in the resistors of a bridge branch is also approximately of the same value. In known arrangements, this has the result that the loss power produced by the resistor connected in series with the first resistor remains unutilized. By the arrangement in accordance with the invention of the second resistor upstream in the fluid, the loss power is used to reduce the response time. Further utilization of this loss power may consist in a partial external heating of the first resistor, whereby there is obtained a reduction in the total power requirement of the probe of the invention. Finally, by the arrangement according to the invention of the third resistor, a cooling of the third resistor by the stream of air is obtained, while in known arrangements it is located in the vicinity of electric circuits and heats them.

The partial external heating of the first resistor by the third resistor is assisted by a further development of the invention which is characterized by the fact that at least a part of the current flow paths of the third resistor (4) is interengaged with the current flow paths of the first resistor (2).

According to another development, a thermal contact is made possible between the first and the third resistors in the manner that a part of the layers of the first and third resistors (2, 4) overlap, an electric insulating layer being provided between the two layers.

Finally, a further development of the invention is that the fourth resistor (1) and the first resistor (2) are developed as layers on a common support. This measure contributes to a further simplification of the arrangement according to the invention.

BRIEF DESCRIPTION OF THE DRAWINGS

With the above and other objects and advantages in view, the present invention will become more clearly understood in connection with the detailed description of preferred embodiments, when considered with the accompanying drawings, of which.

Identical parts have been provided with the same reference numbers in the figures.

DETAILED DESCRIPTION OF THE PREFERRED EMBODIMENTS

Figure 1:
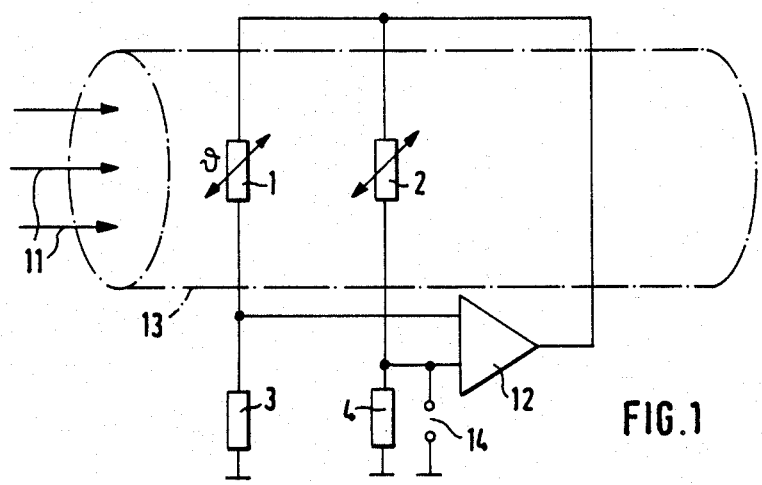
FIG. 1 is a diagrammatic showing of a known arrangement.

In the arrangement of FIG. 1, a stream 11 is conducted in a tube 13. The tube 13 can, for instance, be part of the intake port of an internal-combustion engine in which the air for combustion is guided. For the measurement of the mass of air two, temperature-dependent resistors 1, 2 are provided in the tube 13 in the known arrangement. By means of two additional resistors 3, 4, they are supplemented to form a bridge circuit which is acted on by a voltage which is the output voltage of a difference amplifier 12 whose inputs are connected with respective bridge branches.

The first bridge branch, consisting of a temperature-dependent resistor 2 and a temperature-independent resistor 4, is of relatively small resistance so that the current causes a heating of the resistors 2 and 4, in which connection merely the heating of the resistor 2 located in the stream of air 11 is necessary for the operation of the arrangement shown in FIG. 1.

The second bridge branch, consisting of a temperature-dependent resistor 1 and a temperature-independent resistor 3, is traversed by a current which is so small that practically no heating with respect to the flowing fluid takes place. The second branch of the bridge thus serves for measuring the temperature of the stream of air 11. In order that in the voltage on the bridge diagonals changes which are as large as possible are obtained, the resistors 1 and 3 and 2 and 4 respectively are in each case of approximately the same size.

The control circuit formed by the bridge circuit and the difference amplifier 12 now acts in such a manner that a constant excess temperature of the resistor 2 over the resistor 1 is obtained. In this connection, more electrical energy must be fed to the resistor 2 when the mass of air passing through the tube 13 is greater. The current through the first branch of the bridge and therefore the voltage drop on the resistor 4 is thus a measure of the mass of air.

Figure 2:
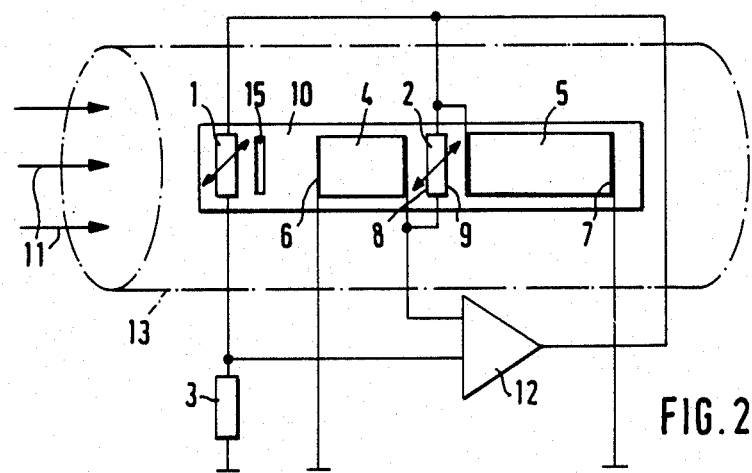
FIG. 2 shows a new embodiment, also diagrammatically.

In the embodiment shown in FIG. 2, the second branch of the bridge, which consists of the temperature-dependent resistor 1 and the temperature-independent resistor 3, is developed in a manner similar to the arrangement of FIG. 1. However, in the first branch of the bridge the resistor 4 is contained in the tube 13. Furthermore, an additional resistor 5 is arranged downstream in the tube 13. The resistor 5 is connected electrically in parallel to the bridge circuit.

The first resistor 2 is, in the same way as in the arrangement of FIG. 1, the actual measurement resistor which is heated above the temperature of the air and the heat given off by which is used as measure of the mass of air passing through the tube 13. The second resistor 5 is so dimensioned that the current passing through it heats it to above the surrounding temperature. Heat is also given off to the stream of air by the third resistor 4.

Figure 3:
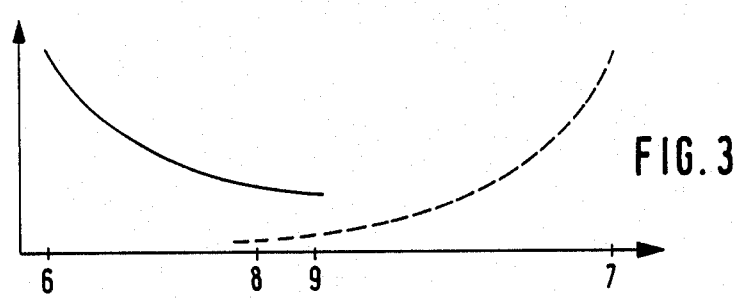
FIG. 3 is a diagram which shows the variation of the coefficient of heat transfer in the direction of flow.

For the further explanation of the invention, reference is had in addition to FIG. 3. The diagram shown in FIG. 3 shows the heat transfer coefficient as a function of the distance from that edge of a sensor which is directed opposite to the flow. Herein, 6 is the location of the edge 6 (FIG. 2) of the resistor 4, and 7 is the location of the edge 7 of the resistor 5. The solid-line curve applies to a flow in forward direction, as indicated by the arrows in FIG. 2, while the dashed line curve represents the heat transfer coefficient in the case of reverse flow. The surface of the resistor 2 lies between the points 8 and 9 which represent the edges of the resistor 2.

By the geometrical dimensions of the first resistor 2, the second resistor 5 and the third resistor 4, the result is now obtained that, upon forward flow, the surface of the first resistor 2 lies in a part of the curve in which the curve is relatively flat so that only insignificant differences in temperature occur within the first resistor 2, which leads to a rapid response time.

The dashed-line curve for the reverse flow lies, within the region of the first resistor, substantially below the curve for the forward flow. Upon the reverse flow therefore the heat transfer coefficient of the first resistor 2 is substantially less. In this way, assurance is had that in the event of return flow a low output voltage results, as can be recognized by a suitable evaluation circuit.

In the embodiment shown in FIG. 2, the resistors 1, 2, 4, 5 are applied as layers to a common support 10.

For better thermal decoupling a slit 15 is provided in the support 10 between the third resistor 4 and the fourth resistor 1. Should a thermal decoupling be necessary in the specific case between the first resistor, on the one hand, and the second resistor 5 and/or the third resistor 4, on the other hand, corresponding slits can also be arranged between said resistors.

In order to obtain an evaluable output voltage of the bridge circuit it is necessary for the third resistor 4 to have a temperature coefficient which differs from the temperature coefficient of the first resistor 2. A temperature coefficient of opposite sign or a temperature-independent resistor is particularly advantageous. Should it result, for reasons of manufacturing technique, that a third resistor 4 is dependent on the temperature in the same direction as the first resistor 2 then, however, the amount of the temperature coefficient of the third resistor 4 should be substantially less than that of the first resistor 2.

A thermal coupling between the first resistor 2 and the third resistor 4 can be obtained by various further developments of the invention. Two examples of this are shown in FIGS. 4 and 5.

Figure 4:
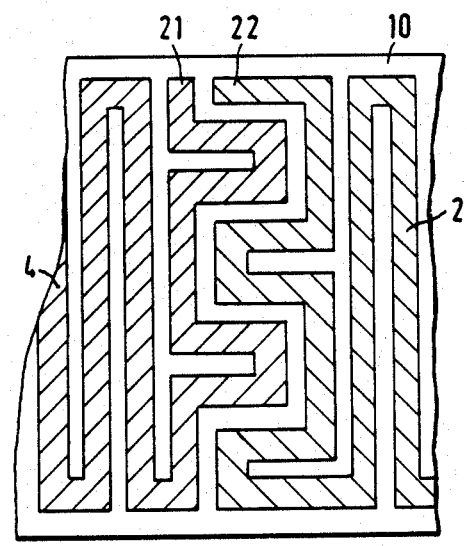
FIGS. 4 and 5 are partial showings of different embodiments.

FIG. 4 is a top view on a portion of the support 10 with the adjacent parts of the first resistor 2 and of the third resistor 4. Both resistors are applied in the form of meander-shaped conductive paths on the support 10 and are shown hatched in FIG. 4. In order to improve the heat transfer between the resistors the conductive paths are interleaved in each other within edge regions. The ends 21, 22 of the conductive paths are provided with suitable contacts, not shown in detail, which in each case form a terminal for the first resistor 2 and the third resistor 4. The other terminals are located outside the portion of the support 10 shown in the figure.

Figure 5:
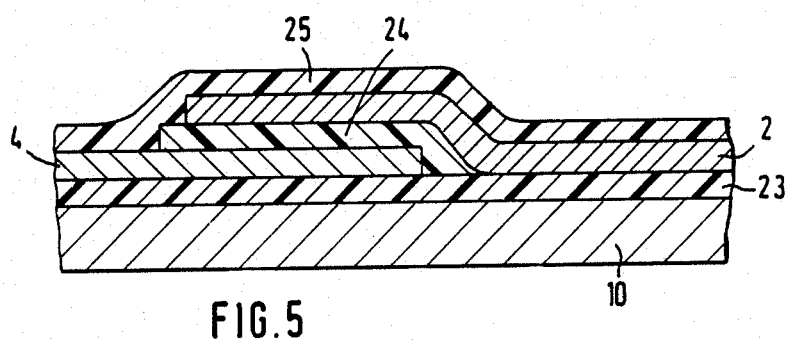

Another possible manner of obtaining thermal contact between the first and third resistors is shown in cross section in FIG. 5. In this figure the thicknesses of the support and of the layers have, in particular, been shown greatly exaggerated. On the support 10 there is applied an insulating layer 23, which can possibly also be dispensed with if the support 10 itself has sufficiently good insulator properties. The layers of the first resistor 2 and the second resistor 4 overlap in part, they being electrically separated from each other by an insulating layer 24. An electrically insulating protective layer 25 is also applied. Depending on the required thermal coupling, a larger or smaller portion of the first resistor 2 and/or of the second resistor 4 can overlap.

We claim:

1. In a measurement probe for measuring the mass of a flowing fluid, particularly the intake air of an internal-combustion engine, having at least one temperature-dependent first resistor which is located in the path of the fluid and is part of a bridge circuit, and wherein the temperature of the first resistor is to be controlled as a function of the flowing mass, an actuating variable being a measure of the mass of the flowing fluid, the improvement comprising a second resistor which is connected in parallel to the bridge circuit, and is located within a path of the fluid downstream of the first resistor, thereby to provide a directional sensitivity to the measurement probe and improved accuracy for pulsating and reverse flow of the fluid; and a third resistor which is also part of the bridge circuit and is connected in series with the first resistor, said third resistor being located in front of said first resistor upsteam in the flowing fluid.

2. A measurement probe according to claim 1, further comprising a common support and wherein said first, said second and said third resistors are applied as layers on a common support.

3. A measurement probe according to claim 2, wherein said common support is structured with slits between the layers of the resistors.

4. The measurement probe according to claim 2, wherein a part of the layers of said first and said third resistors overlap in an overlapping region, there being and electric insulating layer provided between the two layers of said overlapping region.

5. A measurement probe according to claim 1, further comprising plural support and wherein the resistors are applied as layers on said supports.

6. A measurement probe according to claim 1, wherein the temperature coefficient of the third resistor is substantially smaller in amount than the temperature coefficient of first resistor.

7. A measurement probe according to claim 1, wherein the temperature coefficient of the third resistor has a sign which is opposite the sign of the temperature coefficient of the first resistor.

8. A measurement probe according to claim 1, wherein the second resistor has the same temperature coefficient as the first resistor.

9. A measurement probe according to claim 1, wherein the second resistor has a different temperature coefficient than the first resistor.

10. The measurement probe according to claim 1, wherein said first and said third resistors are formed as meander-shaped current paths.

11. The measurement probe according to claim 10, wherein
as measured in the direction of flow, the length of the first resistor is less than the length of the third resistor which is less than the length of the second resistor.

12. The measurement probe according to claim 10, wherein
at least a part of current flow paths in said third resistor is interleaved with current flow paths in said first resistor.

13. The measurement probe according to claim 1, further comprising
a fourth resistor which is temperature dependent, and wherein
the first and third resistors are connected together as a first branch of the bridge circuit, and said fourth resistor is located in the path of flowing fluid and connected in a second branch of the bridge circuit, said fourth resistor acquiring the temperature of the fluid; and wherein said probe further comprises means coupled to said fourth resistor for applying current to said first, said second and said third resistors to establish therein a temperature which is dependent on the temperature of the fluid and higher than the temperature of the fluid.

14. The measurement probe according to claim 13 further comprising a common support and, wherein
the fourth resistor and the first resistor are developed as layers on said common support.

15. The measurement probe according to claim 1, further comprising
additional resistors which are temperature-independent and are connected in parallel to the resistors of the bridge circuit.

16. The measurement probe according to claim 1, wherein
additional resistors which are temperature-independent and are connected in series to the resistors of the bridge circuit.

* * * * *